(No Model.)

W. M. FARR.
SAND BAND.

No. 268,788.

Patented Dec. 12, 1882.

Attest.
John C. Perkins
Sarah M. Farr

Inventor.
Willis M. Farr
By Roscoe B. Wheelon
Atty.

UNITED STATES PATENT OFFICE.

WILLIS M. FARR, OF DOWAGIAC, MICHIGAN.

SAND-BAND.

SPECIFICATION forming part of Letters Patent No. 268,788, dated December 12, 1882.

Application filed October 5, 1882. (No model.)

*To all whom it may concern:*

Be it known that I, WILLIS M. FARR, of Dowagiac, county of Cass, and State of Michigan, have invented a certain Improvement in Sand-Protectors for Vehicles, of which the following is a specification.

The object of my invention is to construct the shell or box of a sand-protector so that it may be attached to the axle of a vehicle in a fixed and rigid manner by locking the parts together, and also in the manner of supporting the shell in an upright position on the axle, preventing the shell from tipping over, as they are liable to do in the usual way of constructing the parts. I provide the shell of the protector with angling shoulders, said shoulders engaging in the recesses cut in the axle, all of which will be hereinafter described.

In order to aid others skilled in the art to which my invention belongs to make and use it, I will proceed to describe its construction and operation with reference to the several drawings forming a part of this specification, in which—

Figure 1:
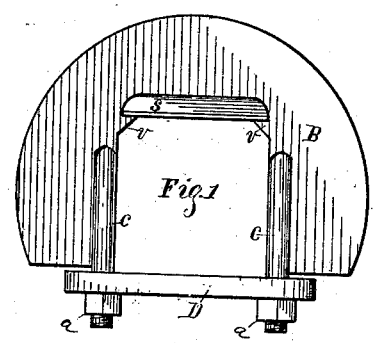
Figure 2:
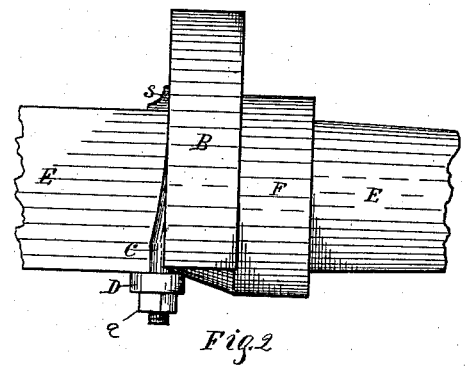
Figure 3:
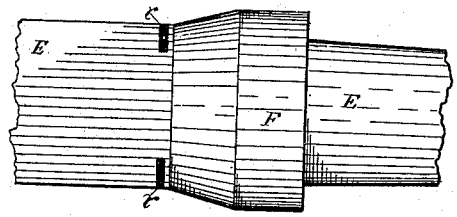

Figure 1 is a rear side view of the sand-shell B. Fig. 2 is an edge view of the same attached to the axle E of a vehicle. Fig. 3 is a top plan view of a portion of the axle, showing the recesses $r\,r$ formed in the upper corners of the axle, all of which will be hereinafter described.

The shell of an ordinary protector has a square opening in its perpendicular part fitting over the axle. In my present invention the shell B has an opening to receive the axle. (See Fig. 1.) In this opening the upper corners are made sloping, and are lettered $v\,v$ across the upper end of the opening, and cast onto the perpendicular part in a bracket lettered $s$. (See Figs. 1 and 2.) The bracket lies upon and crosses the axle, (see Fig. 2,) when the shell is secured to the axle by the clip-tie and nuts. The bracket $s$ forms a bearing upon the axle, thus bracing the shell B, preventing it from tilting from the hub of the wheel. The hub of the wheel turns upon the tapering portion of the axle E, fitting over the usual shoulder, F, of the axle. The wearing of parts causes the wheel-hub to move upon the axle in a lateral direction. The object of the bracket-support S is to prevent the shell B from being tilted over should the end of the wheel-hub rub over against it in its lateral movement upon the axle, as is common, Fig. 3 being a top plan view of a portion of the axle, in which two slots or recesses are formed in the upper corners of the axle. These recesses are cut sufficiently deep to allow the sloping corners $v\,v$ of the shell B to enter them when the shell is placed in position, as shown in Fig. 2. The object of the locking of parts is to prevent the shell from moving laterally upon the axle, thus getting out of place.

Having thus described my present invention as fully as I can, what I claim as new, and desire to secure by Letters Patent, is—

1. In a sand-protector for vehicles, the combination of the shell B, having an opening in its vertical part, said opening having obtuse-angling corners $v\,v$, the horizontal bracket $s$, having a concavous upper surface, cast upon the shell, with the clip-tie and nuts, substantially as shown and described.

2. In a sand-protector for vehicles, the combination of the shell B, having an opening with sloping shoulders $v\,v$, the axle having recesses $r\,r$ to receive the sloping shoulders of the shell, and the clip-tie, as and for the purposes specified.

WILLIS M. FARR.

Witnesses:
ROSCOE B. WHEELER,
SARAH M. FARR.